United States Patent [19]
Chavez, Jr. et al.

[11] Patent Number: 6,088,442
[45] Date of Patent: Jul. 11, 2000

[54] AUTOMATIC WIRELESS ALERTING ON AN AUTOMATIC CALL DISTRIBUTION CENTER

[75] Inventors: David L. Chavez, Jr., Thornton; Larry J. Hardouin, Westminster, both of Colo.

[73] Assignee: Lucent Technologies Inc., Murray Hill, N.J.

[21] Appl. No.: 09/042,459

[22] Filed: Mar. 16, 1998

[51] Int. Cl.[7] ................................................. H04M 3/00
[52] U.S. Cl. ..................... 379/265; 379/93.17; 455/466
[58] Field of Search .................................... 379/265, 266, 379/309, 93.01, 88.15, 93.17; 455/466, 445, 456, 560

[56] References Cited

U.S. PATENT DOCUMENTS

| | | | |
|---|---|---|---|
| 4,582,959 | 4/1986 | Myslinski et al. | 179/27 |
| 4,788,715 | 11/1988 | Lee | 379/84 |
| 4,942,598 | 7/1990 | Davis | 379/57 |
| 5,384,841 | 1/1995 | Adams et al. | 379/266 |
| 5,400,327 | 3/1995 | Dezonno | 370/62 |
| 5,555,297 | 9/1996 | Ochy P. et al. | 379/265 |
| 5,666,399 | 9/1997 | Bales et al. | 379/419 |
| 5,684,872 | 11/1997 | Flockhart et al. | 379/266 |
| 5,841,854 | 11/1998 | Schumacher et al. | 379/265 |

OTHER PUBLICATIONS

D.E. Harvey, et al., "Call Center Solutions", AT&T Technical Journal, Sep./Oct. 1991, vol. 70, No. 5, pp. 36–44.

*Primary Examiner*—Krista Zele
*Assistant Examiner*—Benny Q. Tieu
*Attorney, Agent, or Firm*—John C. Moran

[57] ABSTRACT

Allowing the alerting of supervisors and off duty agents to conditions on a split of an ACD system via wireless terminals. The conditions under which the wireless alerting will be performed are programmed by the owner of the ACD system rather than the manufacturer. The ACD center is connected to a wireless switching system via a primary rate ISDN interface (PRI) link. The ACD system considers the wireless switching system as another ACD system and utilizes the look ahead interflow operation to communicate information to the wireless switching system concerning the condition of a split. This is done by the ACD placing informational telecommunication calls to pseudo telecommunication numbers via the PRI link to the wireless switching system. The wireless switching system is responsive to each of these pseudo numbers to interpret the pseudo number as to the wireless terminal that should be contacted and an alphanumeric message that is to be displayed on that wireless terminal. The alphanumeric message defines the condition of the split to the supervisor or off duty agents of the split. The wireless switching system may be a wireless telephone system or a paging system. The wireless terminals may be wireless telephones or pagers.

4 Claims, 4 Drawing Sheets

AUTOMATIC WIRELESS ALERTING ON AN AUTOMATIC CALL DISTRIBUTION CENTER

TECHNICAL FIELD

This invention relates to telecommunication switching, and, in particular, to automatic call distribution (ACD) systems.

BACKGROUND OF THE INVENTION

ACD systems also referred to as telemarketing centers or call centers, are systems that enable a pool of agents to serve incoming and/or outgoing calls. With the calls being distributed and connected to whichever of the agents happens to be available at the time. When no agents are free and available to handle additional calls, additional incoming calls are typically placed in a holding queue to await agents becoming available. It is common practice to divide the pool of agents into a plurality of groups, commonly referred to as splits, and to assign different types of calls to different splits. For example, different splits may be designated to handle calls pertaining to different client companies, or calls pertaining to different products or services of the same client company. Each split has its own incoming-call queue. In addition, to the agents associated with a split, each split has an assigned supervisor whose responsibility is to assure that the split functions against given criteria.

Furthermore, some large companies find it effective to have a plurality of call centers, each for handling calls within a different geographical area, for example. Each call center, or each split within each call center, typically has its own incoming-call queue. In a multi-queue environment, it can happen that one call center or split is heavily loaded with calls and has a full queue of calls waiting for an available agent, while another call center or split may be only lightly overloaded, and yet another call center or split may not be overloaded at all and actually may have idle agents. To alleviate such inefficiencies, some call centers have implemented a capability whereby, if a call center for handling a particular call is heavily loaded and its queue is overflowing with waiting calls, the call center evaluates the call load of other call centers to determine if one of the other splits or call centers is less busy and consequently may be able to handle overflow calls and do so more promptly. The overflow call is then queued to the first such backup call center that is found instead of being queued within the call center that received it. Such arrangements are known by different names, one being "look ahead interflow". The control of how calls are processed in a ACD system is done for example in the Lucent Technologies ACD systems by program instructions (also referred to as scripts) that are stored in vectors with each split having its own vector. The instructions within a vector allow the customer the ability to customize the operation of their ACD system without resorting to contacting the manufacturer.

Whereas, the ability to do look ahead interflow does allow one call center to automatically transfer incoming calls to another call center, it does not provide a mechanism for alerting a supervisor of a split or off duty agents of a split to an undesired condition on the split. A supervisor does have access to a supervisor's terminal that allows the ACD system to supply the supervisor information concerning the operation of the split. However, this forces the supervisor to remain at their terminal to receive such information. It is highly desirable for the supervisors to be able to roam about the call center and even take short breaks.

The problem then is that a supervisor of the split needs to have mobility and yet be informed of undesired operating conditions of the split.

SUMMARY OF THE INVENTION

A technical advance is achieved by an apparatus and a method that allow the alerting of supervisors and off duty agents to conditions on a split of an ACD system via wireless terminals. Advantageously, the conditions under which the wireless alerting will be performed are programmed by the owner of the ACD system rather than the manufacturer. The ACD center is connected to a wireless switching system via a primary rate ISDN interface (PRI) link. The ACD system considers the wireless switching system as another ACD system and utilizes the look ahead interflow operation to communicate information to the wireless switching system concerning the condition of a split. This is done by the ACD placing informational telecommunication calls to pseudo telecommunication numbers via the PRI link to the wireless switching system. The wireless switching system is responsive to each of these pseudo numbers to interpret the pseudo number as to the wireless terminal that should be contacted and an alphanumeric message that is to be displayed on that wireless terminal. The alphanumeric message defines the condition of the split to the supervisor or off duty agents of the split. The wireless switching system may be a wireless telephone system or a paging system. The wireless terminals may be wireless telephones or pagers.

These and other advantages and features of the invention will become more apparent from the following description of the illustrative embodiments of the invention considered together with the drawing.

DETAILED DESCRIPTION

Figure 1:
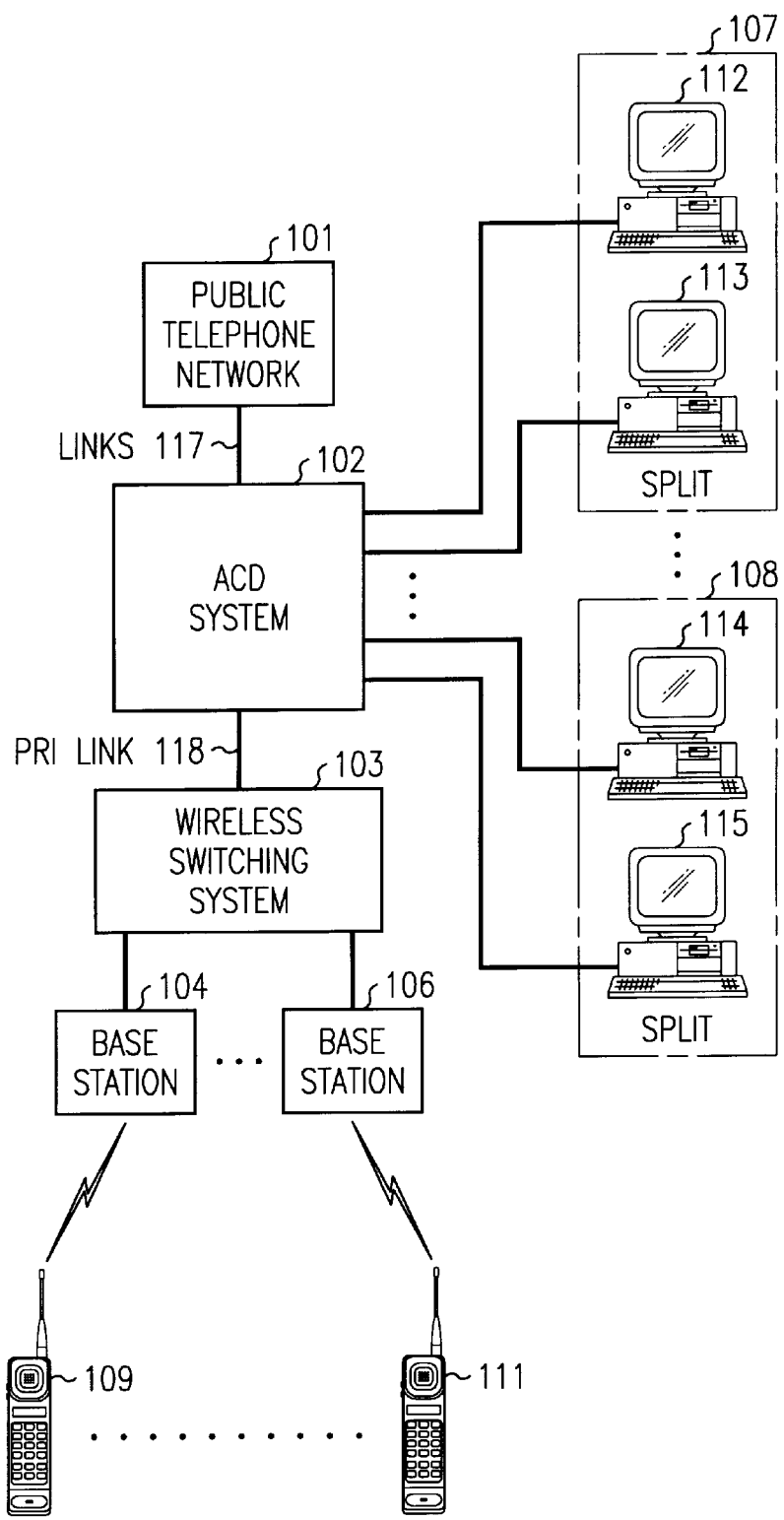
FIG. 1 illustrates, in block diagram form, a system for implementing the invention.

ACD system 102 is interconnected to the public telephone system 101 via links 117. ACD system 102 receives calls from public telephone system 101 via links 117 and directs these calls to splits 107–108. Each split comprises a plurality of agent terminals 112–115. For example, split 108 comprises agent terminals 114–115. An agent sitting at each split is responsive to a particular dialed telephone number received over links 117 from public telephone system 101. Wireless switching system 103 provides wireless telephone service via wireless sets 109–111. Wireless sets 109–111 are interconnected to wireless switching system 103 via base stations 104–106. Wireless set 109 can place a call to another wireless set via wireless switching system 103 or to a telephone connected to public telephone system 101 via base station 104, wireless switching system 103, and ACD system 102. Wireless set 109 is assigned to the supervisor of split 108. Wireless set 109 has a telephone number that is utilized by other telephone devices to place voice calls to wireless set 109. In addition, wireless switching system 103 recognizes a set of informational telephone numbers for wireless set 109 with each of these telephone numbers defining a condition on split 108. Wireless switching system 103 is responsive to these informational telephone numbers to send a data message for display on the display portion of wireless set 109. Other wireless sets could be assigned to other splits. In addition, agents of split 108 could be given wireless terminals when off duty and messages be transmitted to these wireless terminals as a group. For example, wireless set 111 could be assigned to split 107. ACD system 102 is administered to direct calls to these informational telephone numbers to PRI link 118. The informational telephone numbers are transmitted in ISDN set up messages on the D channel of PRI link 118. As will be illustrated later, the informational telephone numbers do not impact the telephone numbers utilized by public telephone system 101 or for voice calls made within ACD system 102 since the informational telephone numbers are distinct from those numbers. One skilled in the art could readily envision that wireless switching system 103 could be a paging system and the wireless terminals could be pagers.

Consider the following example to understand the operation of system illustrated in FIG. 1. ACD system 102 is advantageously the Lucent Technologies Definity ACD private branch exchange (PBX). ACD system 102 serves a plurality of call-handling applications; for example, sales-call-handling, service-call handling, accounting-inquiry-call handling, etc. For each of these applications, ACD system 102 conventionally has a different telephone number, referred to herein as an arriving vector directory number (VDN). In the present example, it is assumed that a customer call that has newly arrived at ACD system 102 is to be directed by the VDN of split 108. The VDN directs the call to be handled by a script which is prepared by the owner of ACD system 102 and not the manufacturer. Further information concerning such scripts is set forth in an application of A. D. Flockhart et al., entitled "Arrangement for Queuing a Call to the Best Split", application Ser. No. 08/552,642, filed Nov. 3, 1995, and assigned to the same assignee as this application, which is hereby incorporated herein by reference. In the present example, ACD system 102 determines that the longest waiting call in the queue for split 108 has exceeded sixty seconds. ACD system 102 then executes a look ahead interflow operation to wireless switching system 103 via PRI link 118. ACD system 102 transmits a telephone number associated with the look ahead interflow call of 8 289 1081. Wireless switching system 103 is responsive to the first four digits to recognize that this is an informational telephone number and to the next three digits, "108" to recognize that a data message is to be transmitted to the wireless set of the supervisor of split 108. The last digit, "1", defines the out of criterion condition that makes it necessary to alert the supervisor of split 108. Wireless set 109 is assigned to the supervisor of split 108. Wireless switching system 103 transmits a data message for display on wireless set 109 that specifies that the split presently has a waiting time that is longer than sixty seconds and has just received another telephone call.

Figure 2:
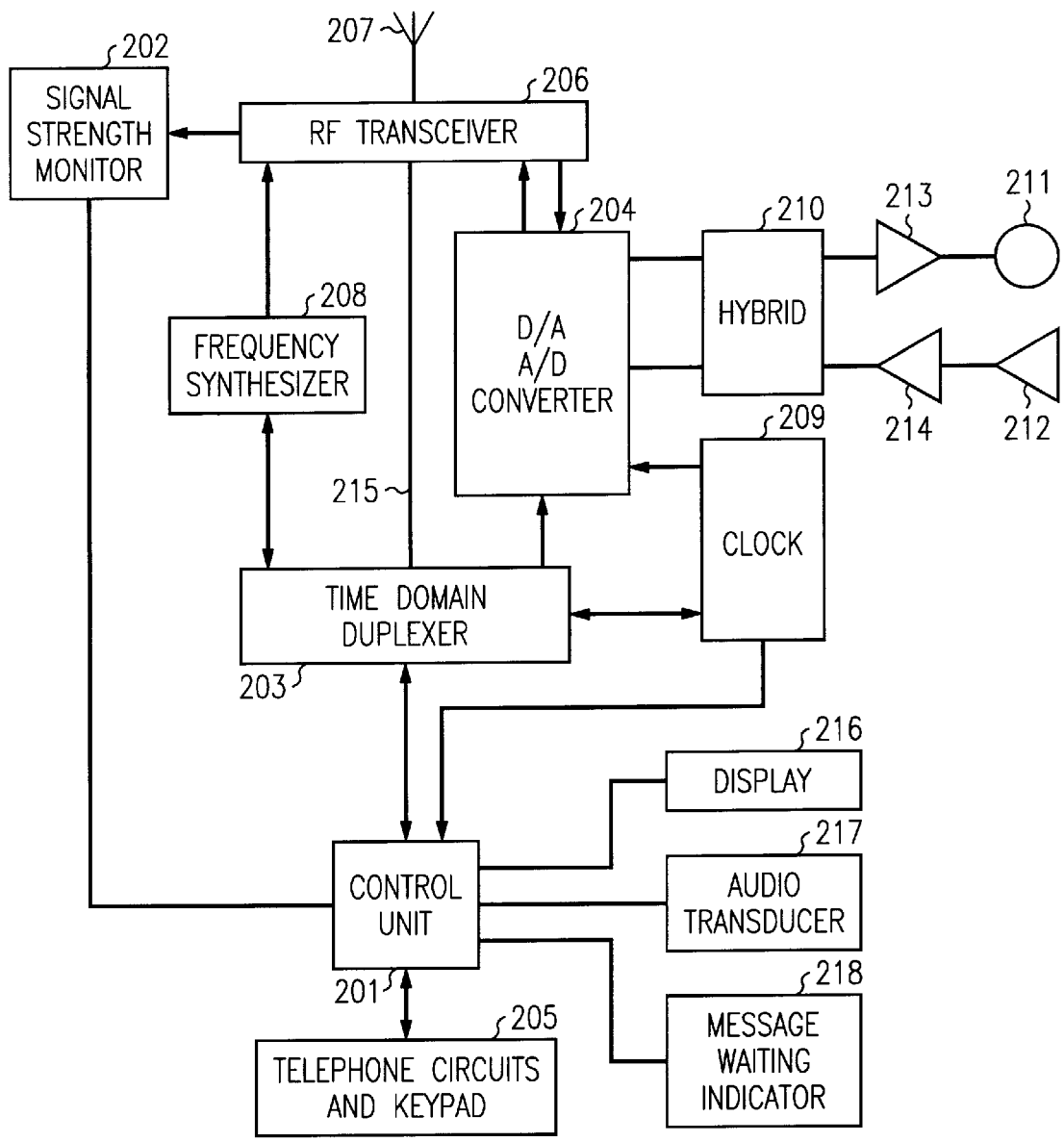
FIG. 2 illustrates, in block diagram form, a wireless terminal for utilization in the system of FIG. 1.

When wireless switching system 103 is a wireless telephone switching system, wireless set 109 is advantageously illustrated in greater detail in FIG. 2. The other wireless sets are similar in design. Wireless set 109 implements a wireless protocol that allows wireless set 109 to maintain a wireless signal link with wireless switching system 103 via base stations included in wireless switching system 103. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless set is provided by control unit 201. Units 202, 203, 206, 207, 208, and 209 provide the RF communication capabilities for the wireless set. Elements 204, 210, and 211–214 provide the audio information received and transmitted to the user; whereas, elements 216–217 and 205 provide the basic user interface. Wireless Switching system 103 uses the message set to update display 216 with the messages described with respect to FIG. 4.

When wireless switching system 103 is a paging system, wireless set 109 is a pager which are well known in the art.

Figure 3:
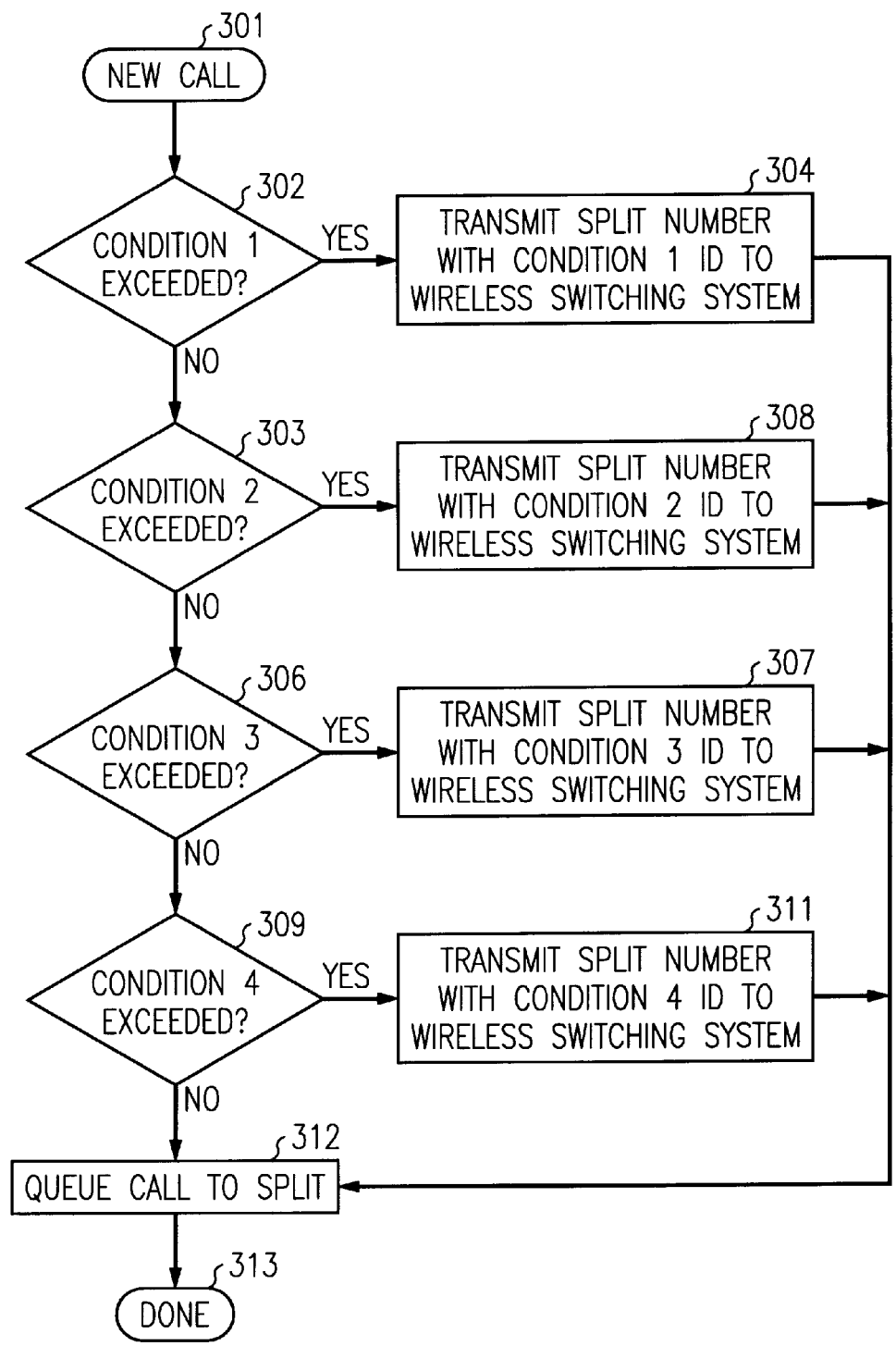
FIGS. 3 and 4 illustrate, in flow chart form, the steps performed to implement the invention.

FIG. 3 illustrates, in flow chart form, the steps performed by ACD system 102 in receiving an incoming call from public telephone network 101 for a split. Decision block 302 determines if the first condition has been exceeded. As way of an example, the first condition is the longest waiting call in the queue for the split exceeding sixty seconds. If the answer is yes, control is transferred to block 304 which transmits to wireless switching system 103 the digits "8289" followed by the digits representing the split number and the digit "1" representing the condition. After execution of block 304, control is transferred to block 312 which adds the call onto the queue of the split before transferring control to block 313 which ends the sequence of the script. One skilled in the art could readily envision that look ahead interflow could be done to another ACD system before execution of block 312.

Returning to decision block 302, if the answer is no, decision block 303 determines if a second condition has been exceeded. Advantageously, this second condition may be that the number of available agents has diminished below a predefined value. If the answer in decision block 303 is yes, block 308 transmits the same information as was done in block 304 with the exception that the last digit will be a 2 before transferring control to block 312.

Returning to decision block 303, if the answer is no, decision block 306 determines if condition 3 has been exceeded. Advantageously, condition 3 may be the number of agents who are presently staffing the queue. If the answer is yes in decision block 306, block 307 transmits the same information as block 304 with the exception that the last digit will be a 3 before transferring control to block 312.

Returning to decision block 306, if the answer is no, decision block 309 determines if a fourth condition has been exceeded. Advantageously, the fourth condition may be the time of day exceeding some predefined time. If the answer in decision block 309 is yes, control is transferred to block 311 which transmits the same information as block 304 with the exception being that the last digit is a 4 before transferring control to block 312.

Figure 4:
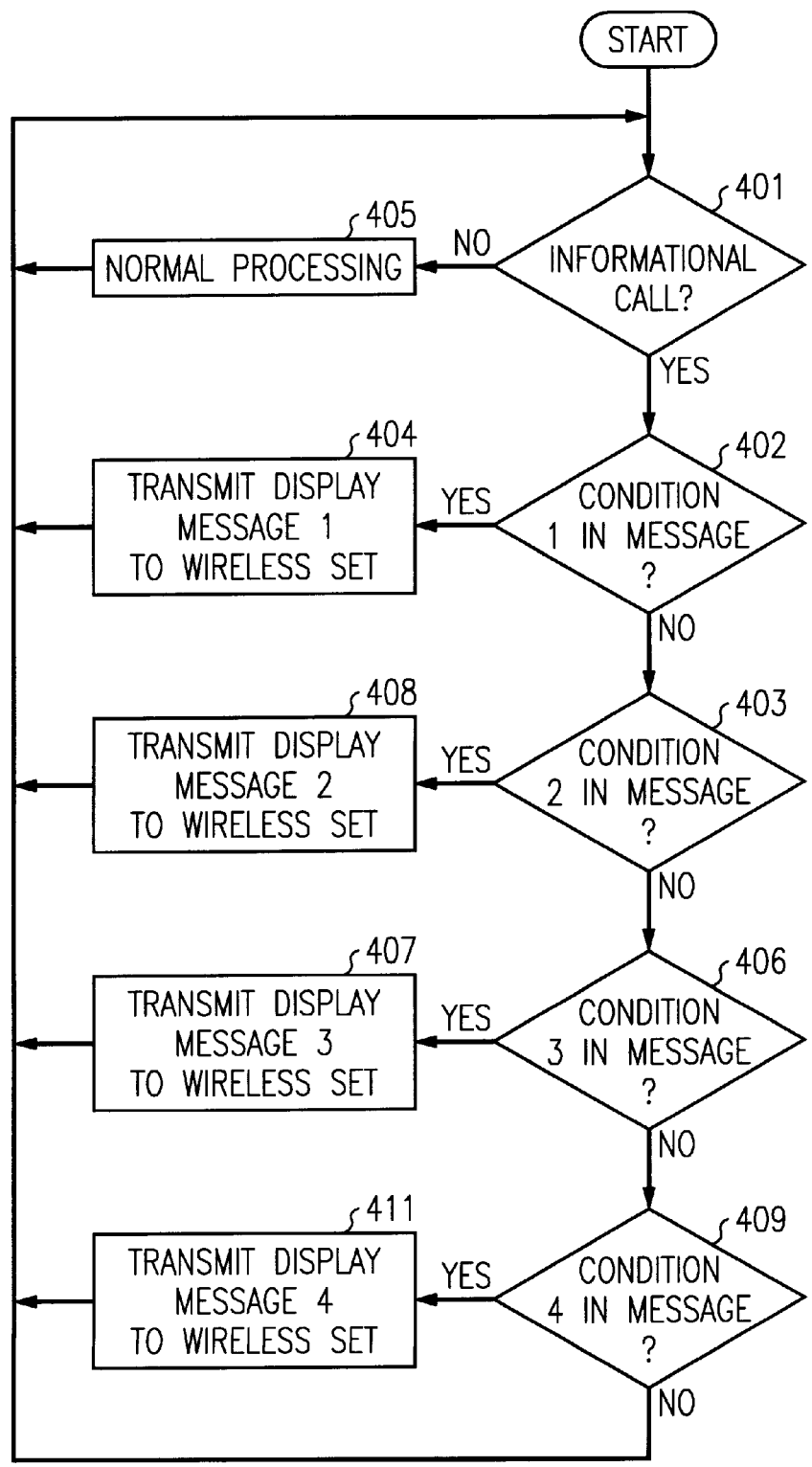

FIG. 4 illustrates, in flow chart form, the steps performed by wireless switching system 103 in implementing the invention. Decision block 401 determines if an informational call as defined by the first four digits of the received telephone number being "8289" has been received. If the answer is no, control is transferred to block 405 that proceeds to handle a call in a normal manner or any other messages from ACD system 102 in a normal manner before transferring control back to decision block 401. If the answer in decision block 401 is yes, block 402 determines if condition 1 ID (as defined by the last digit) is in the set up message received to start the call. If the answer is yes, block 404 determines the wireless set or wireless sets associated with the split as defined in the received telephone number and transmits the predefined message 1 to the display of the determined wireless set or wireless sets before transferring control back to decision block 401. Blocks 403 and 408, blocks 406 and 407, and blocks 409 and 411 function in a manner similar to blocks 402 and 404. Blocks 403–411 differ from the operation of blocks 402 and 404 only in the predefined data message that is sent to the wireless set or wireless sets by wireless switching system 103.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method of displaying information on a plurality of wireless telephones defining conditions on a automatic call distribution system with the plurality of wireless telephones interconnected to the automatic call distribution system via a wireless switching system, comprising the steps of:

detecting a condition on the automatic call distribution system by the automatic call distribution system;

setting up an informational telecommunication call by the automatic call distribution system using a first telephone number that identifies one of the plurality of wireless telephones and defines the condition to the wireless switching system with the first telephone number being different than a second telephone number used to place voice telephone calls to the one of the plurality of wireless telephones;

determining the one of the plurality of wireless telephones from the plurality of wireless telephones connected to the wireless switching system and a message in response to the first telephone number by the wireless switching system;

transmitting the determined message to the determined one of the plurality of wireless telephones; and displaying the transmitted message by the determined one of the plurality of wireless telephones.

2. The method of claim 1 wherein the step of determining further comprises determining a set of the plurality of wireless telephones from the telephone number; and the step of transmitting further comprises transmitting the determined message to the determined set of the plurality of wireless telephones.

3. A method of displaying information on a plurality of wireless telephones defining conditions on a automatic call distribution system with the plurality of wireless telephones connected to a wireless switching system, comprising the steps of:

receiving a first telephone number during the set up of an informational telecommunication call by the wireless switching system with the first telephone number identifying one of the plurality of wireless telephones and defining a condition on the automatic call distribution system and the first telephone number being different than a second telephone number used to place voice telephone calls to the one of the plurality of wireless telephones by the wireless switching system;

determining one of the plurality of wireless telephones from the plurality of wireless telephones connected to the wireless switching system and a message in response to the first telephone number by the wireless switching system; and transmitting the determined message to the determined one of the plurality of wireless telephones for display by the determined one of the plurality of wireless telephones.

4. The method of claim 3 wherein the step of determining further comprises determining a set of the plurality of wireless telephones from the telephone number; and the step of transmitting further comprises transmitting the determined message to the determined set of the plurality of wireless telephones.

\* \* \* \* \*